May 4, 1937.  G. W. EMRICK  2,079,372
TAPPING MACHINE
Filed Sept. 24, 1936
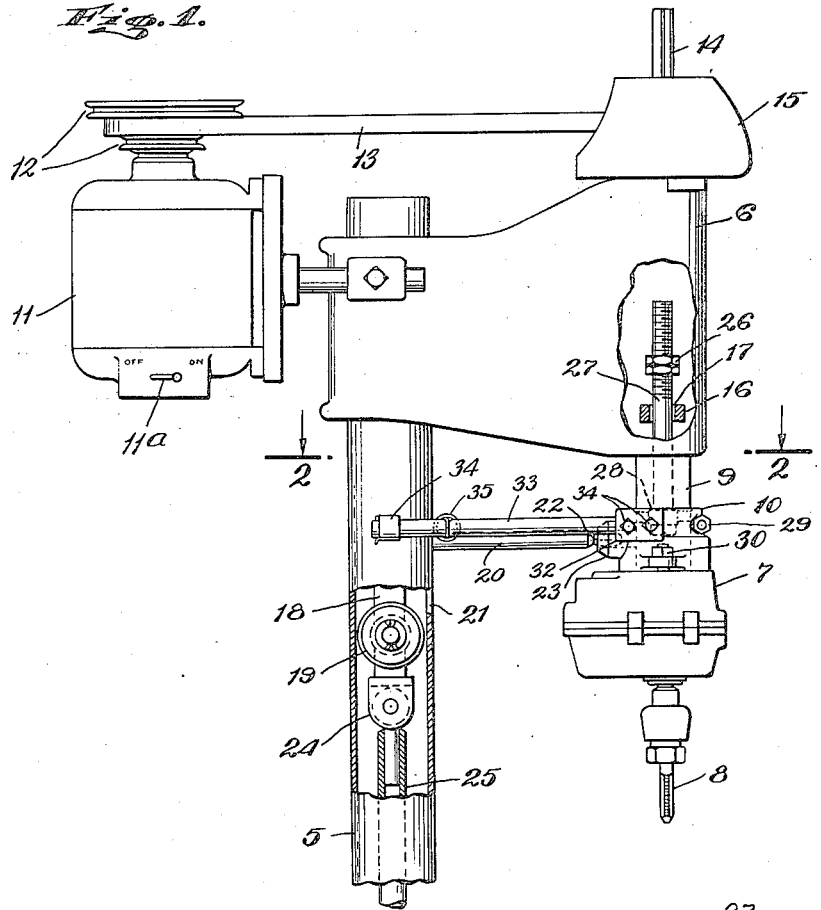
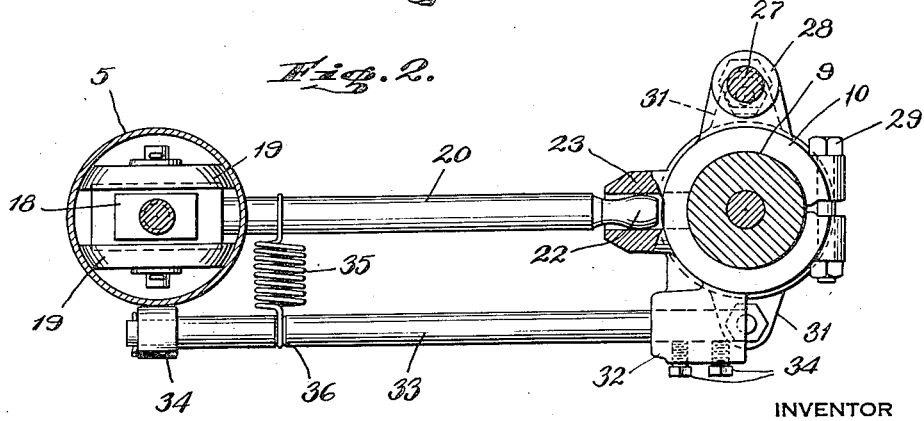
INVENTOR
GEORGE W. EMRICK
BY
ATTORNEY

Patented May 4, 1937

2,079,372

UNITED STATES PATENT OFFICE 2,079,372

TAPPING MACHINE

George W. Emrick, Brooklyn, N. Y.

Application September 24, 1936, Serial No. 102,266

15 Claims. (Cl. 10—129)

This invention relates to tapping machines and particularly to machines of the type and kind disclosed in a prior application filed by me March 5, 1936, and bearing Serial Number 67,272; and the object of the invention is to provide improved means for guiding and supporting the attachment and especially to eliminate or take up the torsional stresses or strains to which the quill supporting the attachment may be subjected; a further object being to provide a torsional take-up or compensating means involving a relatively long rod extending from the quill or attachment and bearing on a part of the frame of the machine so as to minimize the stress or strain of the rod on the frame in resisting such torsional stresses or strains; a further object being to provide the end portion of said rod with anti-frictional means engaging the frame in the sliding movement of the rod with respect to the frame; a further object being to provide tensional means for supporting the rod or anti-frictional means thereof in constant engagement with said frame; a still further object being to provide a clamp ring or member for attachment to the quill of the machine forming a support or mounting for three distinct rods or elements controlling and regulating the operation of the attachment and the quill in connection with which the attachment is supported; and with these and other objects in view, the invention consists in a machine of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a side view of the upper end portion of a machine made according to the invention, with parts of the construction broken away and in section; and, Fig. 2 is a partial section on the line 2—2 of Fig. 1 on an enlarged scale.

The tapping machine shown in part in the accompanying drawing is the same as the tapping machine shown in my earlier application, above identified. In the drawing, 5 represents the vertical standard or column of the machine which is tubular in form, and secured to the upper end of the column is a driving head 6 including the usual mechanism for actuating the spindle for operating the attachment 7 or the tap 8 coupled therewith. The attachment 7 may be of a single or multiple tool type involving one or more taps depending entirely upon the work to be performed. At 9, I have shown the quill which extends from the head 6 and to which is attached or clamped an adapter or mounting member 10.

The head 6 is more or less of conventional construction such as employed in certain types of drill presses, and for this reason, the details of the head are not shown nor described in that any type of head for operating the attachment may be employed. However, in the construction shown, 11 represents an electric motor supported at one side of the head. On the shaft of the motor are a number of pulleys 12, around which a belt 13 passes. Said belt passes around corresponding pulleys on the shaft 14, the pulleys being arranged in a hood or housing 15. The belt and pulley construction provides a conventional variable speed drive for the shaft 14, and at 11a, I have shown a switch controlling the operation of the motor 11. At one side of the head 6 is an outwardly extending stop member 16 which is recessed or apertured as seen at 17 for purposes later described.

Arranged in the tubular standard 5 is a guide carriage or plunger 18 having spaced pairs of guide or bearing wheels 19, the lower wheels being indicated in Fig. 1 of the drawing, and the upper wheels being indicated in Fig. 2 of the drawing. The surfaces of said wheels are beveled to seat and operate in the bore of the tube 5 as clearly seen in Fig. 2 of the drawing. Secured centrally of the body 18 is a guide or coupling rod 20 which extends outwardly through an elongated aperture 21 in the tube 5, and the free end 22 of which is rounded to provide a substantially universal mounting in an outwardly projecting bearing portion 23 of the split member 10.

This construction will provide a free and substantially non-frictional guide and brace for the attachment 7 in the tube 5 in the upward and downward movement of the attachment as well as to provide alinement of the attachment with the tube 5 or the plunger 18 operating therein.

The plunger 18 including the attachment 7 and associated parts is moved upwardly and downwardly through a treadle construction, not shown, which forms part of the subject matter of the earlier application. At 24, I have shown the coupling between the plunger 18 and the tubular connecting rod or link 25 which completes the operative connection of the treadle mechanism with said plunger so that the tapping attachment 7 may be moved downwardly to feed the tape 8 into the workpiece a distance governed and regulated by adjustment nuts 26 arranged on the stop rod 27. The nuts 26 strike the stop 16 as will appear from a consideration of Fig. 1 of the drawing. The rod 27 passes freely through the recess or aperture 17 of the stop and the lower end thereof is connected with an extension 28 on the member 10 as clearly illustrated in Fig. 2 of the drawing. The member 10 is secured to the quill 9 by a bolt 29 passing through the split portion thereof, and the attachment 7 is secured to the member 10 by bolts or screws 30 passing through projecting ears 31 at opposite sides of and at the lower end of the member 10.

The member 10 is also provided with an enlarged part 32 which is apertured to receive a torsional check rod 33 adjustably secured in the part 32 by set screws or the like 34, the rod 33 extending in a direction substantially parallel to the rod 20 and in the direction of the tube 5. The free end of the rod has an anti-frictional roller 34 adapted to normally bear upon the outer surface of the tube 5, being held in this position by a spring 35, one end of which is attached to a recessed portion 36 of the rod 33 and the other end of which engages the rod 20.

By employing torsional compensating means of the type described involving the long rod 33 extending a substantially great distance away from the axis of the quill 9 with its free end provided with an anti-frictional bearing on the tube 5, substantially little friction will prevail at the point of contact of the roller 34 with the tube 5 in resisting the torsional stresses and strains to which the quill is subjected in the operation of the tapping attachment. In other words, the torsional stress and strain is relatively great adjacent the axis of the quill 9, whereas these stresses are minimized at the point where the roller 34 engages the tube 5. In this manner, a very simple and practical means is provided for maintaining proper functioning of the tapping machine, especially through the driving means of the attachment employed, thus producing long life to the machine and eliminating wear and destruction to the machine occasioned by such stresses and strains if not eliminated. As the tapping attachment including the quill 9 moves vertically in the machine, the roller 34 operates vertically upon the outer surface of the tube 5. The rod 33 also serves to maintain proper alinement of the attachment 7 with the plunger 18, thereby eliminating stresses or strains on the plunger guide wheels or rollers, thus providing a freer action of the attachment in the machine.

By employing the supporting or adapter member 10 to which the various rods 20, 27 and 33 are attached, different types of attachments 7 having standardized means for attachment through the bolts or screws 30 with the adapter, may be employed in the machine without dissecting the operative parts of the machine. When different attachments 7 are employed, or different work is performed by any attachment, the adjustment nuts 26 will be moved into position on the stop rod 27 to control and regulate the movement of the tap or taps 8 into a predetermined workpiece. In other words, the part 10 including its associated parts 20, 27 and 33 and the elements coupled therewith, might be regarded as a control unit controlling and regulating movement imparted to the attachment, guiding and bracing the attachment in its supports and compensating for torsional stresses or strains to which the attachment or the quill of the machine may be subjected. In this connection, it will also be apparent that other adaptations and uses of a control unit of this kind might be made within the scope of my invention, the present disclosure being illustrative of only one use or adaptation thereof.

Having fully described my invention, what I claim as new and desire to secure by Letters Patent, is:

1. A tapping machine employing a frame part, a tapping attachment, means for moving and guiding the attachment longitudinally of and in spaced relation to said part of the machine, means on said attachment and engaging said part for resisting the torsional stresses and strains to which the attachment and associated parts are subjected in the operation of the machine, said last named means comprising a long rod projecting from said attachment and engaging said part, tensional means for supporting the rod in constant engagement with said part, and said rod engaging said part through anti-frictional means.

2. A tapping machine employing a frame part, a tapping attachment, means for moving and guiding the attachment longitudinally of and in spaced relation to said part of the machine, means on said attachment and engaging said part for resisting the torsional stresses and strains to which the attachment and associated parts are subjected in the operation of the machine, said part being tubular in form, and said first named means involving a plunger having spaced pairs of bearing wheels for guiding the plunger in its movement in said tubular part.

3. A tapping machine employing a frame part, a tapping attachment, means for moving and guiding the attachment longitudinally of and in spaced relation to said part of the machine, means on said attachment and engaging said part for resisting the torsional stresses and strains to which the attachment and associated parts are subjected in the operation of the machine, said part being tubular in form, said first named means involving a plunger having spaced pairs of bearing wheels for guiding the plunger in its movement in said tubular part, and said plunger including an outwardly projecting supporting rod having a universal coupling with said attachment.

4. A tapping machine employing a frame part, a tapping attachment, means for moving and guiding the attachment longitudinally of and in spaced relation to said part of the machine, means on said attachment and engaging said part for resisting the torsional stresses and strains to which the attachment and associated parts are subjected in the operation of the machine, said part being tubular in form, said first named means involving a plunger having spaced pairs of bearing wheels for guiding the plunger in its movement in said tubular part, said plunger including an outwardly projecting supporting rod having a universal coupling with said attachment, and adjustable means for limiting the movement of the attachment in one direction.

5. An adapter and control unit for the tapping attachments of tapping machines of the class described, said unit comprising a substantially ring-like body, means for detachably supporting a tapping attachment in connection therewith, other means for mounting said body in connection with a support, a guide plunger having a rod coupling the same with said body, another rod coupled with said body and arranged substantially parallel to the first named rod, and a stop rod having adjustable means thereon for limiting the movement of said unit in one direction in the machine.

6. An adapter and control unit for the tapping attachments of tapping machines of the class described, said unit comprising a substantially ring-like body, means for detachably supporting a tapping attachment in connection therewith, other means for mounting said body in connection with a support, a guide plunger having a rod coupling the same with said body, another rod coupled with said body and arranged substantially parallel to the first named rod, a stop rod having adjustable means thereon for limiting the movement of said unit in one direction in the machine, and the second named rod of said unit having an anti-frictional bearing member at its free end.

7. An adapter and control unit for the tapping attachments of tapping machines of the class described, said unit comprising a substantially ring-like body, means for detachably supporting a tapping attachment in connection therewith, other means for mounting said body in connection with a support, a guide plunger having a rod coupling the same with said body, another rod coupled with said body and arranged substantially parallel to the first named rod, a stop rod having adjustable means thereon for limiting the movement of said unit in one direction in the machine, the second named rod of said unit having an anti-frictional bearing member at its free end, and tensional means for coupling the first and second named rods together.

8. In a tapping machine employing a tool operating head with a quill slidably engaging said head, an adapter mounted on said quill, a tapping attachment detachable with respect to said adapter, means independent of said head for supporting and guiding the adapter, quill and attachment in its movement in the machine, and said adapter including an outwardly projecting torsion check rod slidably engaging a part of the machine to take up the torsional stresses and strains to which the quill and associated parts are subjected.

9. In a tapping machine employing a tool operating head with a quill slidably engaging said head, an adapter mounted on said quill, a tapping attachment detachable with respect to said adapter, means independent of said head for supporting and guiding the adapter, quill and attachment in its movement in the machine, said adapter including an outwardly projecting torsion check rod slidably engaging a part of the machine to take up the torsional stresses and strains to which the quill and associated parts are subjected, and anti-frictional means on said check rod where it slidably engages the frame.

10. In a tapping machine employing a tubular standard, a tool operating head supported at the upper end of said standard, said head having a quill slidably engaging the same in spaced relation to said tubular standard, means involving an adapter for coupling a tapping attachment with said quill, means involving a plunger slidably mounted in said tubular standard for supporting and guiding the adapter in its movement in the machine, and means independent of said last named means for checking rotary movement of the adapter in one direction to compensate for torsional stresses and strains to which the same may be subjected in the operation of the machine.

11. In a tapping machine employing a tubular standard, a tool operating head supported at the upper end of said standard, said head having a quill slidably engaging the same in spaced relation to said tubular standard, means involving an adapter for coupling a tapping attachment with said quill, means involving a plunger slidably mounted in said tubular standard for supporting and guiding the adapter in its movement in the machine, means independent of said last named means for checking rotary movement of the adapter in one direction to compensate for torsional stresses and strains to which the same may be subjected in the operation of the machine, and said last named means comprising a rod extending from said adapter to said tubular standard and adapted to slidably engage the outer surface of said standard.

12. In a tapping machine employing a tubular standard, a tool operating head supported at the upper end of said standard, said head having a quill slidably engaging the same in spaced relation to said tubular standard, means involving an adapter for coupling a tapping attachment with said quill, means involving a plunger slidably mounted in said tubular standard for supporting and guiding the adapter in its movement in the machine, means independent of said last named means for checking rotary movement of the adapter in one direction to compensate for torsional stresses and strains to which the same may be subjected in the operation of the machine, said last named means comprising a rod extending from said adapter to said tubular standard and adapted to slidably engage the outer surface of said standard, and tensional means for supporting said rod in constant engagement with said standard.

13. A tapping machine employing an elongated frame part, a tapping attachment, means movable longitudinally of the frame part including an arm extending radially therefrom for guiding the attachment longitudinally of and in spaced relation to said part of the machine, and means on and supported by said attachment and engaging said part and movable longitudinally of said part for resisting the torsional stresses and strains to which the attachment is subjected in the operation of the attachment and in the movement thereof longitudinally of said part.

14. A tapping machine employing an elongated frame part, a tapping attachment, means movable longitudinally of the frame part including an arm extending radially therefrom for guiding the attachment longitudinally of and in spaced relation to said part of the machine, means on and supported by said attachment and engaging said part and movable longitudinally of said part for resisting the torsional stresses and strains to which the attachment is subjected in the operation of the attachment and in the movement thereof longitudinally of said part, and said last named means comprising a long rod supported at one side of the attachment and arranged substantially parallel to said radially extending arm.

15. A tapping machine employing an elongated frame part, a tapping attachment, means movable longitudinally of the frame part including an arm extending radially therefrom for guiding the attachment longitudinally of and in spaced relation to said part of the machine, means on and supported by said attachment and engaging said part and movable longitudinally of said part for resisting the torsional stresses and strains to which the attachment is subjected in the operation of the attachment and in the movement thereof longitudinally of said part, said last named means comprising a long rod supported at one side of the attachment and arranged substantially parallel to said radially extending arm, and tensional means between said arm and rod for supporting the rod in constant engagement with said part.

GEORGE W. EMRICK.